PLANETARY GEAR SYSTEM AND GEARS THEREFORE

BACKGROUND OF THE INVENTION

This invention relates in general to planetary transmission systems and gearing and deals more particularly with an improved single-stage compound planetary gear system embodying such gearing.

Heretofore it has been general practice in the planetary transmission art to utilize multi-staging of a series of planetary gear sets where high ratios of speed change (greater than about 10:1) have been required. In special cases where size, weight and efficiency have not been critical, compound planetary gearing has been used in high gear ratio transmissions. Either approach has generally utilized involute gears or modified involute gear forms. In such transmission systems it has been the usual practice to utilize wide gears, that is gears wherein the ratio of the face width to pitch diameter (F/D) is greater than 1 to compensate for high Hertzian stresses encountered in high-ratio meshes. This approach has been generally preferred to the use of relatively large diameter gears to maintain proper design stress limits on gear teeth and bearings. However, such wide gears are usually relatively heavy and tend to produce more severe load gradients across the tooth faces due to axial misalignments between meshing gears. Self-aligning mechanisms have been utilized such as floating, spline members, cams, and flexing type mechanisms to overcome this problem, however, the provision of such special support structures add substantially to the cost and complexity of a transmission system.

The present invention is concerned with the aforesaid problems. Specifically, it is the general aim of the invention to provide an improved single-stage compound planetary gear system which utilizes improved gearing whereby a broad range of high-gear ratios can be attained in a relatively simple transmission system utilizing gears having low face width to pitch diameter ratios (F/D less than 1.0).

SUMMARY OF THE INVENTION

In accordance with the invention, a planetary gear system is provided which has a first ring gear, a pair of planet gears, and means supporting the planet gears for coaxial rotation in unison and about the axis of the first ring gear with one of the planet gears in mesh with the first ring gear. A sun gear journaled for coaxial rotation relative to the first ring gear meshes with the other of the planet gears. The system further includes a second ring gear journaled for coaxial rotation relative to the first ring gear and in mesh with the other planet gear. At least one of the sets of meshing gears in the system has gears engaged along a line of action in accordance with the equation:

$$Y = -(\chi_p \tan\phi_o + \chi_p^3 b)$$

Wherein:
$\phi_o$ is the pressure angle;
Y is one rectangular coordinate of a point on the line of action;
$\chi_p$ is the other rectangular coordinate of said point; and b has a value other than zero.

BRIEF DESCRIPTION OF THE DRAWINGS

FIG. 4 is a diagramatic illustration of a pair of involute gears of the prior art.

FIG. 5 is a diagramatic illustration of a pair of gears embodying the invention.

FIG. 6 is a graphic illustration of a condition of optimal tooth geometry, a comparable condition of an involute tooth form being indicated by a broken line.

DETAILED DESCRIPTION OF PREFERRED EMBODIMENT

Figure 1:
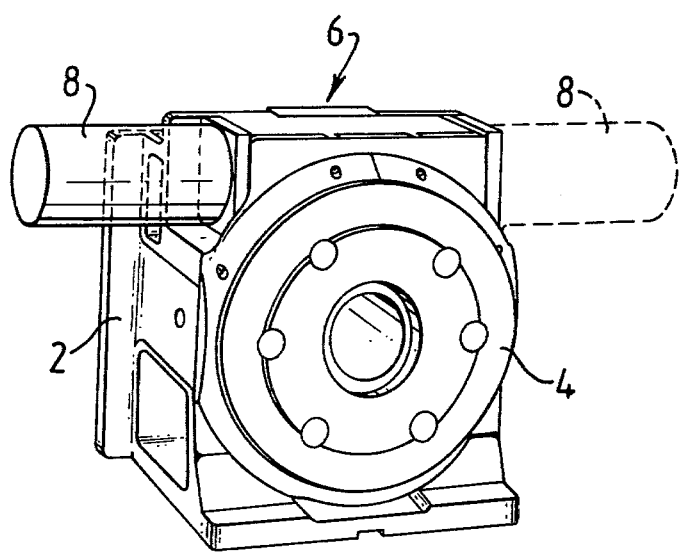
FIG. 1 is an axial sectional view through a high-ratio compound planetary transmission embodying the invention.
Figure 2:
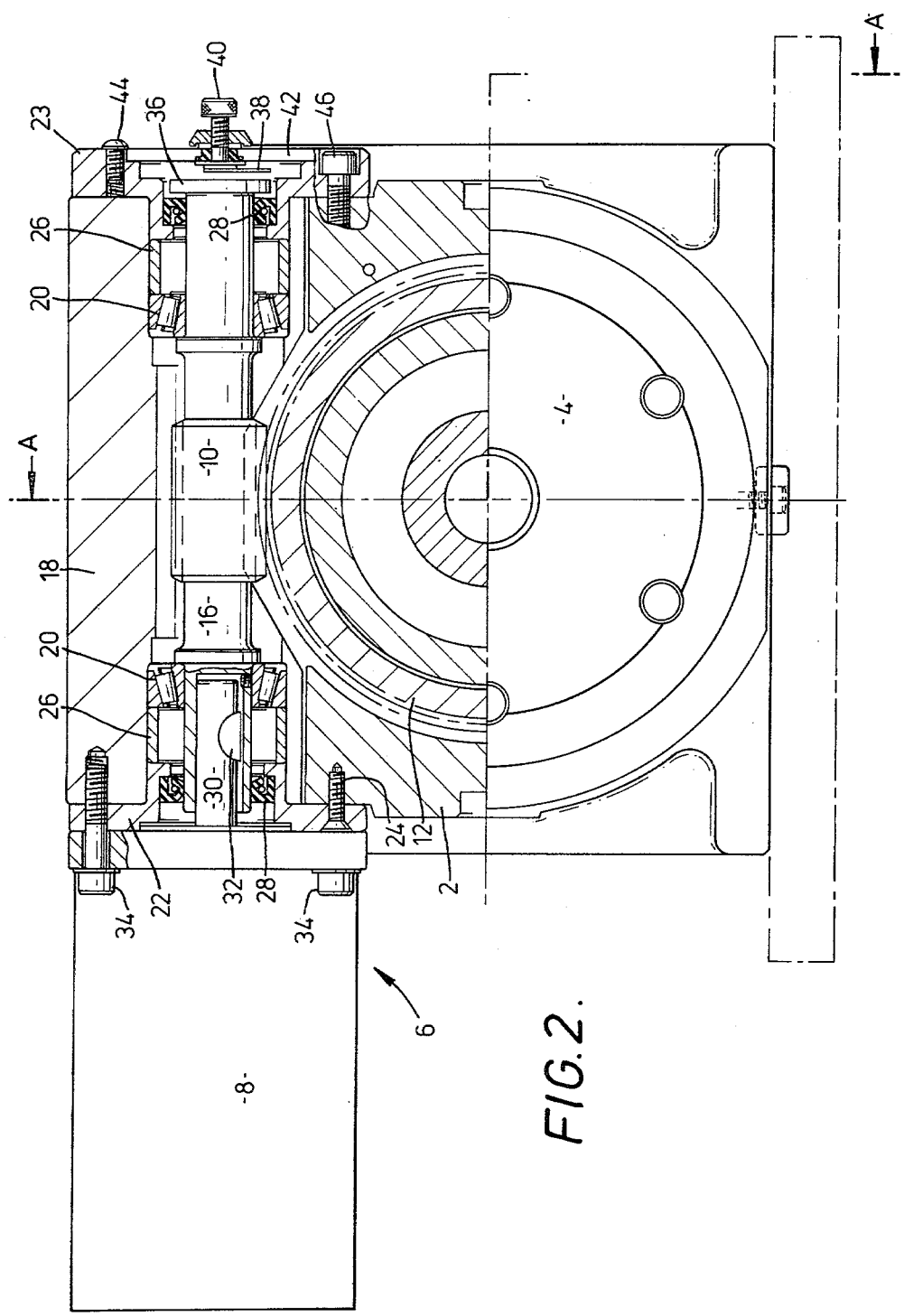
FIG. 2 is a sectional view taken along the line 2—2 of FIG. 1.

Turning now to the drawings and referring first particularly to FIG. 1, a high-ratio compound planetary gear box or transmission embodying the invention is indicated generally by the reference numeral 10. The transmission 10 includes a housing 11 and a fixed ring gear 12 which has an axis 14 and functions as a reaction member. A sun gear 16, mounted on an input shaft 18, is journaled for rotation about the axis 14. In accordance with the invention, at least one planet pinion, indicated generally at 20, and which includes a pair of planet gears 22 and 24, is supported by bearings 26, 26 in a carrier or cage 28 for coaxial rotation in unison about an axis 30. The illustrated transmission 10 includes three such planet pinions supported in axially parallel and equiangularly spaced relation by the carrier 28, as best shown in FIG. 2. The carrier 28 is journaled in bearings 29, 29 mounted on the input shaft 18 and rotates about the axis 14 with the planet gear 22 in intermeshing engagement with the ring gear 12 and the planet gear 24 in intermeshing engagement with the sun gear 16. Another ring gear 32 carried by an associated output shaft 34 is intermeshingly engaged with the planet gear 24 and journaled for rotation about the central axis 14 by another bearing 35 mounted on one end of the input shaft 18. While the shafts 18 and 34 are designated, respectively, as input and output shafts it will be apparent that the shaft 34 could function as the input shaft and the shaft 18 as the output shaft without modifying the structure.

In accordance with the present invention, at least one pair of mating gears, and preferably all of the mating gears in the aforedescribed gear train, are configured to provide optimal tooth profile contact, as will be hereinafter further discussed, to minimize Hertzian stresses, so that gears of relatively narrow width may be utilized in the system 10. This arrangement permits a wide range of gear ratios while maintaining conservative stress levels. In the illustrated embodiment 10 the face width-pitch diameter ratio (F/D) of the various gears is less than 1.0. Furthermore, a wide range of input/output ratios may be attained for a single gear box envelope with minimal modification, all of which will be hereinafter further discussed. Further, and in accordance with the invention the radial clearance in the bearings 26, 26, substantially enlarged and designated by the numeral 36, is greater than the eccentric tolerance 38 of the system, that is the eccentric tolerance between the axes

INDEXING DEVICE

This invention relates to an indexing device.

Indexing devices are used with machine tools to provide, for example, controlled rotation of a workpiece or of a toolholder carrying several tools. In use, an indexing device may be mounted on the table of a milling machine with a workpiece supported on a face plate of the indexing device. The face plate can be rotated by precise angles to present required portions of the workpiece to the cutter of the milling machine. To drive the face plate, the indexing device may have a motor projecting to one side of the indexing device. It is important that the projecting motor does not come into contact with parts of the milling machine when the table of the milling machine is traversed. In conventional indexing devices, the position of the motor is fixed, and this imposes a constraint on the position of the indexing device on the table of the milling machine. For example, if it is possible for the indexing device to be mounted at the left hand end of the table of a milling machine with the motor projecting away from structural parts of the milling machine for one operation, it may not be possible to move the indexing device to the other end of the table and to turn it round through 180°, because the motor would then project in the opposite direction and may come into contact with parts of the milling machine. Previously, when such circumstances have arisen, it has been necessary to use a different indexing device of which the motor projects in the opposite direction.

According to the present invention, there is provided an indexing device comprising a face plate, which is rotatably mounted in a housing, and a drive unit including a motor, the drive unit being adapted to be fitted to the housing in driving engagement with the face plate in either one of two mutually angularly offset positions.

With an indexing device constructed in accordance with the present invention, the drive unit, including the motor, can be removed from the housing, rotated through, for example, 180°, and replaced, the motor then projecting from the opposite side of the indexing device. This facility greatly increases the versatility of the indexing device.

For a better understanding of the present invention, and to show how it may be carried into effect, reference will now be made, by way of example only, to the accompanying drawings, in which:

FIG. 1 is a perspective view of an indexing device;

FIG. 2 is a partly sectioned view of the device of FIG. 1; and

Figure 3:
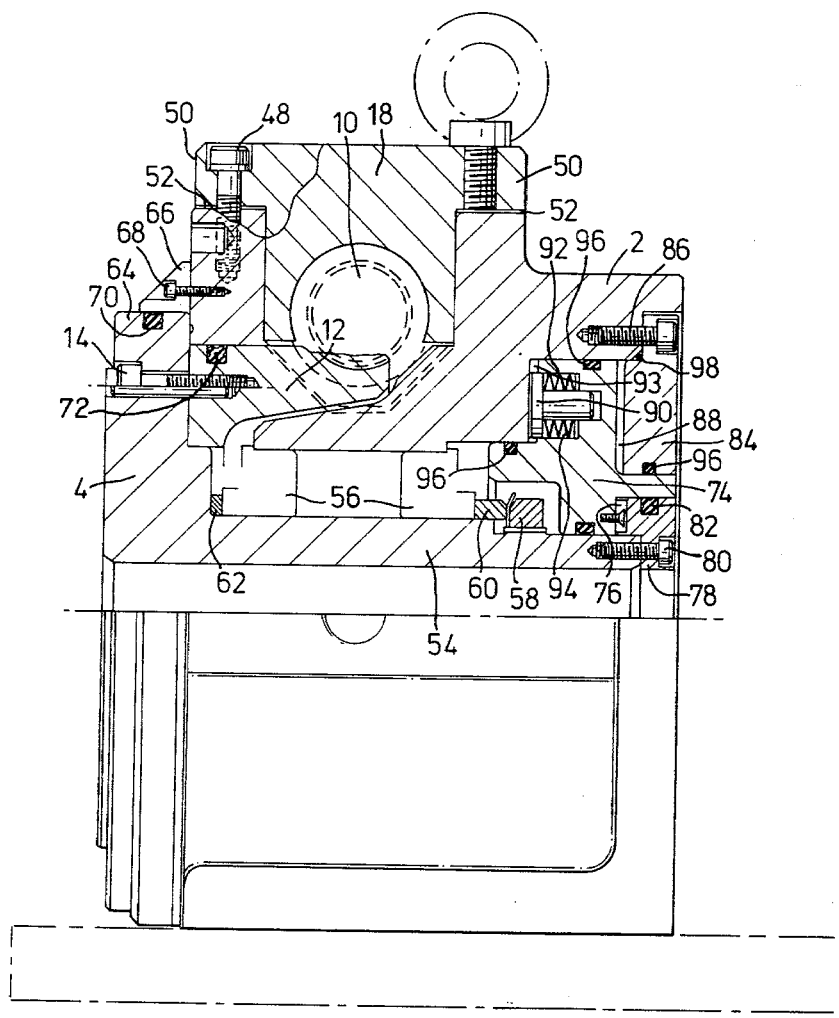
FIG. 3 is a fragmentary transverse sectional view of a gear and shows a typical tooth embodying the invention, the general profile of a comparable involute tooth being shown in broken lines.

FIG. 3 is a partly sectioned view taken along the lines III—III in FIG. 2.

As seen in FIG. 1, the indexing device comprises a housing 2 in which a face plate 4 is rotatably supported. A drive unit 6 is provided for driving the face plate 4, this drive unit 6 including a stepping motor 8.

Referring now to FIGS. 2 and 3, the stepping motor 8 is connected to drive a worm 10 which meshes with a worm wheel 12 connected to the face plate 4 by screws 14. The rotary axis of the motor 8 lies in a plane which is perpendicular to the rotary axis of the face plate 4.

The worm 10 is formed on a shaft 16 which is supported by taper roller bearings 20 in a block 18 of the drive unit. The bearings 20 are preloaded by end caps 22 and 23 of the drive unit which are secured by screws 24, only one of which is shown in FIG. 2. The end caps 22 and 23 act on the bearings 20 through spacers 26, and the magnitude of the preload can be altered by changing the axial length of the spacers 26. Sealing rings 28 provide a seal between the shaft 16 and the end caps 22 and 23.

The output shaft 30 of the stepping motor 8 is received in a bore in one end of the shaft 16, where it is rotationally fixed by a key 32. The stepping motor 8 is secured to the block 18 and to the housing 2 by screws 34, which extend through the end cap 22.

At the end of the shaft 16 away from the motor 8, there is a flange 36 which has a zero mark. A pointer 38 is provided for indicating an initial reference position of the shaft 16. The pointer can be rotated manually by a knob 40. The pointer 38 and the flange 36 are visible through a transparent cover 42 which is bonded to the end cap 23 and is held in position by a screw 44. The end cap 23 is secured to the block 18 and the housing 2 by screws 46, only one of which is shown in FIG. 2.

As shown in FIG. 3, the block 18 is clamped to the housing 2 by screws 48, only one of which is shown in FIG. 3. The block 18 has two shoulders 50, and laminated "peel-off" shims 52 are provided between the shoulders 50 and the housing 2. These shims 52 are made up of steel wafers, each wafer being, for example, 0.002 inches thick.

The face plate 4 has a hollow shaft 54 which is supported in the housing 2 by bearings 56. The shaft 54 is axially retained within the housing 2 by a retaining nut 58 and spacer rings 60 and 62. The periphery 64 of the face plate 4 is marked with graduations which move past a reference indication on a ring 66 when the face plate rotates. The ring 66 is secured to the housing 2 by screws 68. A sealing ring 70 is provided between the face plate 4 and the ring 66, and a sealing ring 72 is provided between the worm wheel 12 and the housing 2.

A brake constituted by a piston 74 is accommodated in the housing 2 at the end away from the face plate 4. A friction lining 76 is screwed to the piston 74 and, as shown, is in contact with a collar 78 which is fastened to the shaft 54 by screws 80. There is a sealing ring 82 between the collar 78 and the piston 74. An annular plate 84 is secured to the housing 2 by screws 86 and defines, with the piston 74, a chamber 88. Plungers 90, of which only one is shown in FIG. 3, are received in bores 92 in the piston 74. Each plunger 90 is pushed by a stack of disc springs 94 outwardly of its bore 92 into engagement with a surface of the housing 2. To increase the braking effect, the force of the springs 94 may be assisted by introducing air or other fluid under pressure into a chamber 93 between the piston 74 and the housing 2. In some cases, the springs 94 may be dispensed with, the braking force being applied solely by air or fluid supplied to the chamber 93. Sealing rings 96 are provided between the piston 74 on one hand and the housing 2 or the end plate 84 on the other hand. There is also a sealing ring 98 between the end plate 84 and the housing 2.

For operation, the housing 2 is bolted to the table of a milling machine or other machine tool. When the face plate 4 is not being rotated, the disc springs 94 press the friction lining 76 into contact with the collar 78, so locking the face plate 4 to the housing 2. For this purpose the piston 74 is fixed against rotation relatively to the housing 2 by means which are not shown in the drawings. To release the braking force applied by the friction lining 76, fluid, for example air, under pressure is admitted to the chamber 88 through ducts which are not visible in the drawings. This moves the piston 74 to the left as seen in FIG. 3, so compressing the disc springs 94 and moving the friction lining 76 out of contact with the collar 78. Where the braking force is applied by pressurized fluid in the chamber 93, the braking force is released by only venting the chamber 93. To rotate the face plate 4, the stepping motor 8 is activated by electrical pulses which drive the face plate through the reduction gearing constituted by the worm 10 and the worm wheel 12. The frequency of the pulses may be varied to vary the speed of rotation of the face plate. By electronically counting the number of pulses applied to the stepping motor 8, it is possible to determine the precise angle through which the face plate 4 has been rotated. It should be noted that, where the braking force is applied by the springs 94 and released by compressed air in the chamber 88, failure of the air supply will automatically cause the brake to be applied, so locking the face plate 4 in position until the air supply resumes.

The indexing device illustrated is suitable for use with tape controlled machines. When the machine finishes an operation on one part of a workpiece supported by the face plate 4, the machine delivers a signal to a control unit for the indexing device which results in a predetermined number of pulses being applied to the stepping motor 8 to rotate the workpiece by the required amount to present the next part of the workpiece to the milling machine for machining.

As will be appreciated from FIG. 2, the stepping motor 8 projects to one side of the housing 2. In some circumstances, it may be necessary to position the indexing device on the machine tool in such a position that the stepping motor 8, in the position illustrated in FIG. 2, might come into contact with parts of the milling machine to which the indexing device is fitted, and this could severely damage the indexing device. Alternatively, it may be inconvenient for other reasons to have the stepping motor 8 projecting in the direction indicated in FIG. 2. To avoid these inconveniences, the indexing device illustrated has the facility that it is possible to remove the drive unit 6, including the stepping motor 8, and to replace it the other way round, so that the stepping motor 8 projects to the right of the housing 2 as seen in FIG. 2 and as shown in dotted outline in FIG. 1. This changeover is achieved by unscrewing the screws 44, 46 and 48, removing the motor 8, unscrewing the screws 24, lifting out the assembly comprising the block 18, the end caps 22 and 23 and the worm 10 and replacing them the other way round. The screws 24 can then be inserted again to apply the correct preload to the roller bearings 20, the motor 8 replaced and the screws 44, 46, and 48 replaced and tightened.

The shims 52 govern the extent of the meshing between the worm 10 and the worm wheel 12. As these components wear, the amount of blacklash between them will increase. This undesirable situation can be rectified by moving the axis of the shaft 16 closer to the axis of the worm wheel 12, thus moving the teeth of the worm 10 deeper between those of the worm wheel 12. This is achieved by peeling off the required number of wafers from each of the shims 52.

Although the indexing device has been described as a device for supporting workpieces in machine tools, it can also be used for other purposes. For example, it could be used as an automatic tool-changer, where a number of tools are connected to the face plate at different angular positions, so that rotation of the face plate would bring a different one of the tools into a machining position.

I claim:
1. An indexing device comprising:
   a housing;
   a face plate mounted on the housing for rotation about a face plate axis;
   a worm wheel in the housing and secured to the face plate and having a rotational axis coaxial with the axis of the face plate;
   a drive unit comprising a motor and a worm which is drivable in rotation about
   a worm axis by the motor and which meshes with the worm wheel; and adjustment means for adjusting the distance between the worm axis and the worm wheel axis;
   the drive unit being adapted to be fitted to the housing in driving engagement with the face plate in at least two mutually angularly offset positions.

2. An indexing device as claimed in claim 1, in which the two positions of the drive unit are offset from each other by 180°.

3. An indexing device as claimed in claim 1, in which, when the drive unit is fitted to the housing, the motor projects from the housing.

4. An indexing device as claimed in claim 1, in which, when the drive unit is fitted to the housing, the rotary axes of the motor shaft and worm are coaxial and lie in a plane which is perpendicular to the rotary axes of the face plate and worm wheel.

5. An indexing device as claimed in claim 1, in which the motor is a stepping motor.

6. An indexing device as claimed in claim 1, in which the drive unit is provided with an indicating means for indicating the angular position of the motor.

7. An indexing device as claimed in claim 1, in which a brake is provided for locking the face plate relative to the housing.

8. An indexing device as claimed in claim 1, in which the drive unit is clamped against a surface of the housing, and in which the adjustment means comprises peel-off shims provided between the drive shaft and the surface of the housing.

* * * * *